US006607141B2

(12) United States Patent
Paarporn

(10) Patent No.: US 6,607,141 B2
(45) Date of Patent: Aug. 19, 2003

(54) DECENTRALIZED PUMPING SYSTEM

(76) Inventor: Somchai Paarporn, 12509 Seurat La., North Potomac, MD (US) 20878

( * ) Notice: Subject to any disclaimer, the term of this patent is extended or adjusted under 35 U.S.C. 154(b) by 0 days.

(21) Appl. No.: 09/912,369

(22) Filed: Jul. 26, 2001

(65) Prior Publication Data

US 2002/0033420 A1 Mar. 21, 2002

Related U.S. Application Data

(60) Provisional application No. 60/222,621, filed on Aug. 2, 2000.

(51) Int. Cl.$^7$ ................................................. F24D 3/00
(52) U.S. Cl. ............................ 237/8 R; 237/63; 236/36
(58) Field of Search ..................... 237/63, 8 R; 236/36; 62/435, 436, 185; 165/299, 218, 219; 417/326, 14

(56) References Cited

U.S. PATENT DOCUMENTS 3,425,485 A * 2/1969 Newton ....................... 165/218
4,248,292 A * 2/1981 Beacham .................... 62/185 X
4,280,335 A * 7/1981 Perez et al. ................. 62/435 X
4,335,848 A * 6/1982 Eidejus ..................... 165/218 X
5,003,787 A * 4/1991 Zlobinsky ..................... 62/185
5,622,221 A * 4/1997 Genga, Jr. et al. ....... 165/219 X

* cited by examiner

Primary Examiner—William Wayner

(57) ABSTRACT

Decentralized centrifugal pumps (62) with variable speed drivers located at cooling or heating coils (74) are utilized to circulate and regulate liquid through the coils, main supply line (42), and main return line (48). Pump speed is controlled to satisfy temperature or pressure settings of a control agent served by the coil. Central distribution pumps, modulating control valves, and balancing valves are no longer required to circulate and regulate the flow. Without the balancing valves and control valves, there will be less pressure drops and waterpower losses in the piping system. Thus, the decentralized pumping system will require less pump power and energy consumption than the central pumping system.

Figure 1:
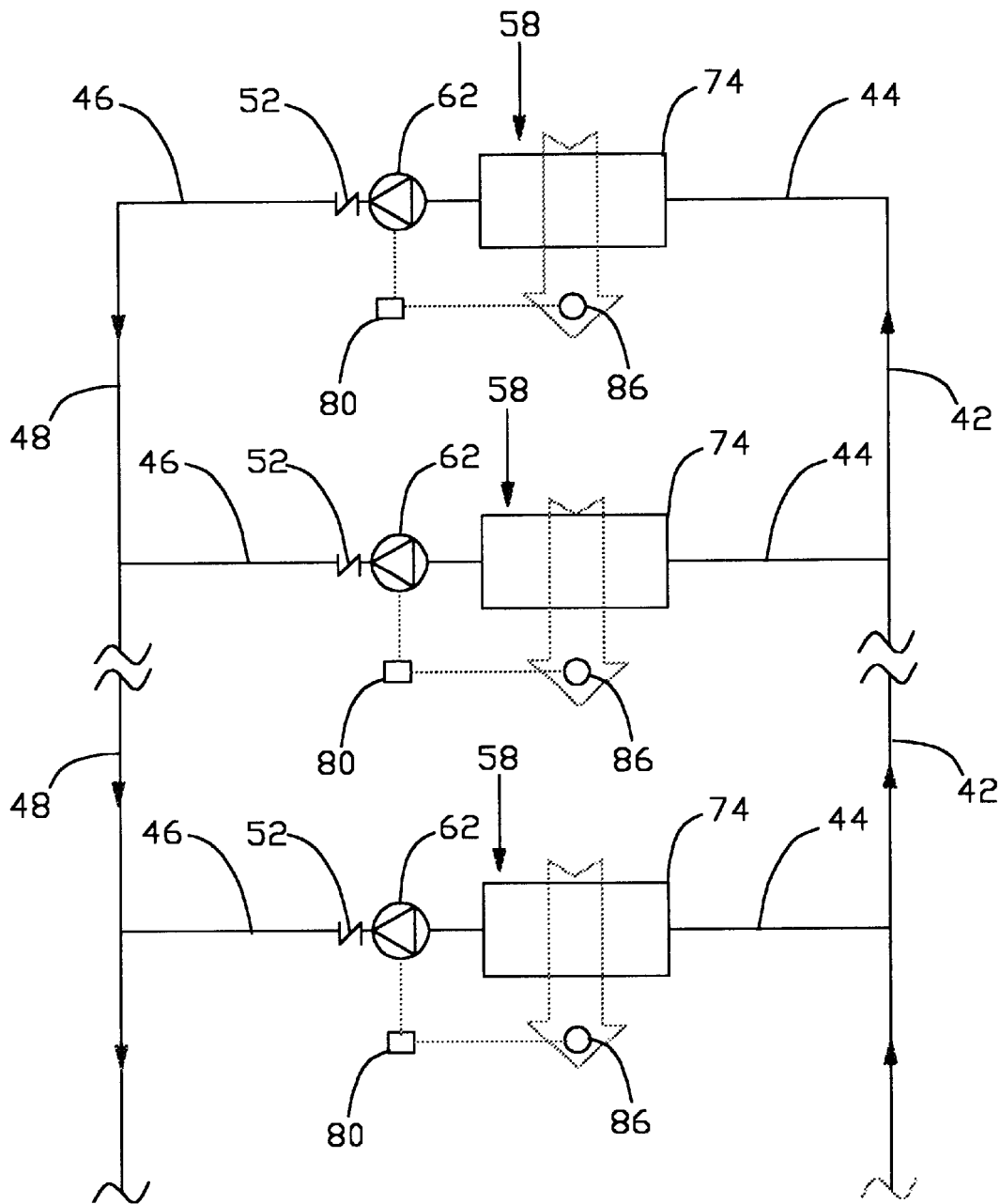

3 Claims, 1 Drawing Sheet

DECENTRALIZED PUMPING SYSTEM

CROSS REFERENCE TO RELATED APPLICATION a. This application is entitled to the benefit of Provisional Patent Application No. 60/222,621 filing dated Aug. 2, 2000 under the title of invention Local Pumping System.

b. An article "Decentralizing Centrifugal Pumps" by Somchai Paarporn published in ASHRAE Journal September 2000.

c. Foreign Patent Document:

| 2245967 | 1/1992 | United Kingdom |

BACKGROUND

1. Field of Invention

This invention relates to centrifugal pumps with variable speed drivers specifically to reduce pump power and energy usage in distribution of liquid through piping, coils, and cooling or heating equipment.

2. Background of the Invention

In a hydronic piping system, centrifugal pumps provide the primary force to circulate liquid through cooling or heating coils, cooling or heating equipment (such as chillers, boiler, or cooling towers), and distribution piping by overcoming water pressure drops and power losses of the coils, equipment, and piping. Originally the distribution pumps are located in a central location with the cooling or heating equipment. The cooling or heating coils are usually located in the spaces where they serve. Balancing valves and control valves are installed at the coils to modulate liquid flow by creating pressure drops and power losses across the valves.

The central distribution pumps are either constant speed or variable speed. The constant speed pumping system is usually installed with three-way control valves at the coils. The constant speed pump does not reduce pump power or energy consumption at part load. The variable speed pumping system is preferable in a large system with two-way control valves at the coils to reduce pump energy at part load. The control valves modulate the flow of liquid through the coils as required by the coil outputs. Pump head is selected from a flow path that has the highest pressure drop in the piping system. Pump speed is controlled to maintain differential pressure across the end of supply and return mains or across selected critical zones. A variable speed motor with a variable frequency drive is normally used to control the pump speed. Flow rate, pump speed, pump head, and pump power are all reduced at part load.

Variable speed pumping system can be arranged in variable-primary pumping arrangement, primary-secondary pumping arrangement or primary-secondary-tertiary pumping arrangement. In the variable-primary pumping arrangement, the primary pumps are variable speed. The primary pumps circulate liquid through a load loop and cooling or heating equipment. The load loop comprises coils, control valves, balancing valves, main supply lines, and main return lines. In the primary-secondary pumping arrangement, the primary pumps are constant speed. The primary pumps serve cooling or heating equipment in a primary source loop. The secondary pumps are variable speed and serve the load loop. A de-coupled line separates the primary source loop from the load loop. A flow meter located in the de-coupled line controls the primary pumps and the equipment to ensure that flow in the primary source loop is adequate for the load loop. The primary-secondary-tertiary pumping arrangement is used in a large campus where central cooling and heating equipment serve several buildings through central supply mains and central return mains. The primary pumps serve the central equipment in the primary source loop. The secondary pumps serve the central supply mains and central return mains. The tertiary pumps are variable speed and serve the load loops in the buildings. Variable speed pumps serving the load loops in every arrangement are located in central locations with balancing valves and control valves located at the coils.

Control valves are used in the pumping system to modulate liquid flow through the coils to satisfy temperature or pressure settings of the controlled agents. Control valves, either two way or three way, are usually selected at approximately 5 psi pressure drop when the valves are fully open at design flow. However, in actual operations the pressure drops are much higher than 5 psi. The actual pressure drops are dependent upon the valve locations in relation to the pump location. The closer a control valve is to the pump, the higher the pressure drops across it. The wide range of pressure drops makes it very difficult to select control valves to achieve linearity between the control valve positions and the coil outputs. For this reason, the balancing valves are normally installed in series with the control valves to reduce pressure drop across the control valves. Pressure drop across control valves and balancing valves create waterpower losses and energy losses in the piping system.

U.K. patent 2245967 proposed replacing control valves with pumps to overcome the difficulty of the control valve selection and operation. The proposed coil pumps are variable speed with either a centrifugal type or a positive displacement type. The positive displacement type pump is not a concern in this present invention. The centrifugal type pumps have by-pass pipes added to the cooling coil or heating coil circuits to isolate the coil circuits from the main supply line and main return line. The coil pumps circulate liquid in the coil circuits only, while the central pump is used to circulate liquid in the main supply line and main return line. The system requires balancing valves to balance flow in the main distribution lines and coil circuits.

BRIEF SUMMARY OF THE INVENTION

In accordance with the present invention, the central distribution pumps, balancing valves, and modulating control valves are eliminated from the hydronic piping system. Decentralized centrifugal pumps with variable speed drivers located at the coils are utilized to circulate and regulate liquid through the load loop. Cooling or heating equipment can be located inside or outside the load loop.

The speed of each pump is independently controlled to satisfy temperature or pressure settings of a control agent served by the coil. Without the balancing valves and control valves, there will be less pressure drops and waterpower losses in the piping system. Thus, the decentralized pumping system will require less pump power and energy consumption than the central pumping system.

OBJECTS AND ADVANTAGES

Accordingly, several objects and advantages of the decentralized pumping system are:

a. To provide centrifugal pumps which are driven by variable speed drivers.

b. To provide centrifugal pumps which will be located at the coils without modulating control valves at the coils.
c. To provide centrifugal pumps which will be located at the coils without balancing valves and by-passed pipes at the coils.
d. To provide centrifugal pumps which will circulate and regulate liquid through the coils, main supply line, and main return line in the load loop without central distribution pumps.
e. To provide centrifugal pumps which speeds are controlled to satisfy temperature or pressure settings of control agents served by the coils.
f. To eliminate pressure losses and waterpower losses in the balancing valves and control valves, which will reduce pump waterpower.
g. To eliminate the maintaining of differential pressure across the end of supply main and return main, which will further reduce pump waterpower at part load.
h. To reduce pump power and energy consumption.
i. To provide decentralized pump and driver in an air-conditioning unit as a single package, which will reduce equipment cost, installation cost, and space requirement.

DRAWING FIGURE

FIG. 1 shows a flow diagram for embodiments of an improved system according to the invention.

REFERENCE NUMERALS IN DRAWING

| | |
|---|---|
| 42 Main supply line | 44 Branch supply line |
| 46 Branch return line | 48 Main return line |
| 52 Check valve | 58 Branch circuit |
| 62 Decentralized centrifugal pump | 74 Coil |
| 80 Controller | 86 Sensor |

DESCRIPTION—FIG. 1

Embodiments of the pumping system of the present invention are illustrated in FIG. 1. FIG. 1 shows a centralized pumping system serving a load loop comprising branch circuits 58, a main supply line 42, and a main return line 48. Each of the branch circuits comprises a branch supply line 44, a branch return line 46, a coil or group of coils 74 serving a same controlled variable, a decentralized centrifugal pump 62, and a check valve 52 installed at the pump outlet. Cooling or heating equipment (not shown) can be located inside the load loop or outside the load loop. The equipment located outside the load loop will be coupled with the decentralized pumping system through a de-coupled line (not shown), as in a prior art. Pump 62 can be installed either before or after the coil in its branch circuit. Coil 74 can be a cooling coil, heating coil, or condenser coil and is installed within an air-conditioning unit. The air-conditioning unit can be an air handling unit, heat-pump unit, water-cooled package unit, or glycol-cooled package unit.

Pump 62 can be an in-line pump, end-suction pump, split-case pump, or turbine pump. Pump 62 is driven by a driver equipped with a variable speed drive. The driver can be a single phase or three phase electric motor, internal combustion engine, or steam turbine. The variable speed drive can be a mechanical operating device or electrical operating device. Pumps 62 can be arranged in series or parallel to serve coil 74. A controller 80 and a sensor 86 serving a controlled variable are used to control the pump speed.

Pump 62 and coil 74 are located in the area or vicinity to the area that they serve which can be a room or rooms in a floor or floors, a floor or floors, or a building. Sensor 86 can be a temperature, humidity, or pressure sensor located in a control agent which can be air, gas, liquid, or refrigerant.

Operation

In FIG. 1, pumps 62 circulate liquid through coils 74 in branch circuits 58, main supply line 42, and main return line 48. Check valves 52 are installed at the outlet of the pumps to prevent liquid flow back when the pumps are stop. Each pump head is selected by summing all pressure losses in its flow path.

Controllers 80 receive control signals from sensors 86, compare the signals to the controller set points, and send output signals to the related variable speed drives. The variable speed drives will increase or decrease the pumps speed and flow to the related coils in the branch circuits, the main supply lines, and the main return line. The speed of each pump is independent from the others.

From the pump affinity laws flow varies linearly with the pump speed, but heat outputs from most cooling and heating coils are not linear with the flow rate. Thus, a direct digital controller with proportional, integral, and derivative functions is preferable to control the pump speed.

The decentralized pumps circulate, and at the same time, regulate liquid as required through the coils, the main supply line, and the main return line. Thus, central distribution pumps and control valves are no longer required to circulate and regulate the flow. Also, balancing valves are no longer required to reduce pressure drop across the control valves, and differential pressure controllers are no longer required to control the central pump's speed. Without the control valves and balancing valves, there will be less pressure drop and waterpower loss in the branch circuits. Thus, the decentralized pumping system will require less waterpower than the central pumping system at designed load and part load.

Conclusion, Ramification, and Scope

Decentralized centrifugal pumps with variable speed drivers located at the cooling or heating coils are utilized to circulate and regulate liquid through the load loop to reduce pump power and energy consumption by eliminating the central distribution pumps, control valves, and balancing valves. Cooling or heating equipment can be located within the load loop or outside the load loop.

The decentralized pumps are smaller than the central pumps. Generally, smaller pumps and drivers have lower efficiencies and higher unit costs per horsepower than larger pumps and drivers. Thus pump power, calculated from waterpower and efficiencies of both pump and driver, energy consumption, and initial costs should be considered before selecting the decentralized pumping system.

Air-conditioning unit manufacturers that make air-conditioning units can also provide decentralized pumps, motors, and variable speed drives within the units as a single package. Manufacturer installation of the pumps within the units will reduce equipment cost, installation cost, and space requirements compared to field installation of the pumps outside the units.

I claim:
1. A pumping system where a plurality of centrifugal pumps serving a hydronic heating or cooling system without a plurality of modulating control valves, a plurality of balancing valves, and a central pump or a plurality of central pumps serving a plurality of coils comprising:

a. said centrifugal pump having a variable speed driver located at said coil,
b. said centrifugal pump circulating and regulating liquid through a branch circuit of said coil, main supply line, and main return line in a load loop,
c. a check valve located at the outlet of said centrifugal pump,
d. means for controlling the speed of said centrifugal pump to satisfy controlled variable settings of a control agent served by said coil, whereby said pumping system will require less pump power and energy consumption comparing to prior art pumping system.

2. The pumping system of claim 1 wherein said centrifugal pumps are arranged in series or parallel to serve said coil.

3. The pumping system of claim 1 wherein said centrifugal pump and said variable speed driver are installed within an air-conditioning unit.

* * * * *